(12) United States Patent
Robbins et al.

(10) Patent No.: US 10,440,471 B2
(45) Date of Patent: Oct. 8, 2019

(54) NOISE VIOLATION LOCALIZATION IDENTIFIER

(71) Applicants: Jesse Lee Robbins, Seattle, WA (US); Garrett Michael Rysko, Bellevue, WA (US); Devan James Tatum, Seattle, WA (US); Soloman Stone Keiter, Seattle, WA (US)

(72) Inventors: Jesse Lee Robbins, Seattle, WA (US); Garrett Michael Rysko, Bellevue, WA (US); Devan James Tatum, Seattle, WA (US); Soloman Stone Keiter, Seattle, WA (US)

(73) Assignee: Cithaeron Inc, Seattle, WA (US)

( * ) Notice: Subject to any disclaimer, the term of this patent is extended or adjusted under 35 U.S.C. 154(b) by 0 days.

(21) Appl. No.: 16/129,667

(22) Filed: Sep. 12, 2018

(65) Prior Publication Data
US 2019/0082256 A1     Mar. 14, 2019

Related U.S. Application Data

(60) Provisional application No. 62/557,838, filed on Sep. 13, 2017.

(51) Int. Cl.
| | |
|---|---|
| *H04R 3/00* | (2006.01) |
| *G06T 7/70* | (2017.01) |
| *G08B 25/00* | (2006.01) |
| *G06K 9/32* | (2006.01) |
| *G06K 9/00* | (2006.01) |
| *H04R 1/40* | (2006.01) |

(52) U.S. Cl.
CPC ........... *H04R 3/00* (2013.01); *G06K 9/00771* (2013.01); *G06K 9/00791* (2013.01); *G06K 9/325* (2013.01); *G06T 7/70* (2017.01); *G08B 25/006* (2013.01); *H04R 1/406* (2013.01); *H04R 2430/23* (2013.01)

(58) Field of Classification Search
CPC ........... G06K 2209/15; G06K 9/00785; G06K 9/00771; G06K 9/00791; G06K 9/325; G06T 2207/10016; G06T 7/70; H04R 3/00; H04R 1/406; H04R 2201/403; H04R 2430/23; G08B 25/006
USPC ....................................... 381/56
See application file for complete search history.

(56) References Cited

U.S. PATENT DOCUMENTS

2015/0271613 A1*   9/2015   Farahat ............. G01H 3/04
                                                    381/56

FOREIGN PATENT DOCUMENTS

CN            106404165 A   *   2/2017

* cited by examiner

*Primary Examiner* — Yogeshkumar Patel
(74) *Attorney, Agent, or Firm* — Kyle Straughan; Karr Tuttle Campbell

(57) ABSTRACT

Described herein are methods, systems, and devices which in some embodiments may be used to detect noise produced by a vehicle and identify the vehicle that is the source of the noise.

20 Claims, 11 Drawing Sheets

NOISE VIOLATION LOCALIZATION IDENTIFIER

PRIORITY CLAIM

This application claims priority to and/or the benefit of U.S. provisional patent application Ser. No. 62/557,838 filed Sep. 13, 2017. The foregoing application is incorporated by reference in its entirety as if fully set forth herein.

FIELD OF THE INVENTION

This invention relates generally to a device and method for detecting and penalizing noise violations.

SUMMARY

Noise pollution and violations of noise laws from personal motor vehicles (e.g. cars and motorcycles) adversely affect residential and commercial areas, disrupting peace and tranquility and negatively impacting the mental, emotional, physical health, and well-being of individuals in those areas.

Cities are experiencing excessive noise as people modify their motorized vehicles to produce sound levels which, according to multiple scientific organizations, can have a severe impact on the human body. Studies estimate that hundreds of millions of people in the United States are at risk of health ailments every year due to noise, at an increasing rate as cities grow in size. While unrest around noise annoyance is growing, people feel powerless to stop it and there is little recourse or enforceability. Federal, State, and local authorities have a difficult time enforcing noise citations as there are constraints—time and technology related—on the police force.

Present policy around noise enforcement utilizes technologies which require a police officer to be present while measuring one or more noise levels to determine if an excessive noise violation has occurred. This situation puts the police officer in harm's way and also disallows them from focusing on other higher priority engagements. Creation of new policy is further hampered by the lack of capabilities with existing technologies and methodologies. Policy makers have done the best that they can with these limited technologies.

Present methods to measure one or more noise levels require hours of specific training on specialized measurement devices. These devices need to be used within a set of very specific parameters to successfully measure one or more noise levels and be actively operated by a police officer in a constant manner to determine if a noise-related violation has occurred. The one or more noise levels need to be measured with a device that is positioned at a set distance away from the source of the noise. In addition, the device needs to be specifically tested and calibrated prior to each law enforcement related use per local legislation. Use of a measurement device is compounded for police officers in noisy environments due to the fact that they must be able to visually and audibly identify the source of the measured noise amongst a cacophony of background noise.

Current image processing techniques struggle to capture images of an overall environment that can be used as evidence of a noise-related violation when the violation occurs under poor environmental conditions. Present automated license plate capture techniques must zoom directly onto the license plate and must be calibrated during install-time for the angle in which the license plate faces. This requires deploy-time configuration, and limits the installation to stationary deployments. Additionally, present image processing techniques struggle to identify the license plate at night due to light sources which wash out license plate characters, such as vehicle headlights or reflections. This is currently solved by zooming in on the license plate, with the tradeoff of losing image content that provides context of the overall environment, or having to install multiple sets of daytime/nighttime cameras to capture images of the entire environment.

In some embodiments, a method is provided that may include, but is not limited to, measuring one or more levels of noise, determining a location where the noise was produced, and obtaining at least one image of the location where the noise was produced. In some embodiments, the method may optionally include determining a time when a level of noise was measured. In some embodiments, the method may optionally include processing data related to the measured level of noise and data related to an image of the location where the noise was produced to identify the source of the noise. In some embodiments, the method may optionally include using location data and image data to identify a vehicle as the source of the noise. In some embodiments, the method may optionally include obtaining license plate associated information for a vehicle identified as the source of the noise. In some embodiments, the method may optionally include analyzing a measured noise level to determine if the measured noise level exceeds a threshold value. In some embodiments, the method may optionally include analyzing a measured noise level to determine if the measured noise level exceeds a legally defined threshold value. In some embodiments, the method may optionally include sending an alert to a law enforcement related entity if a measured noise level exceeds a legally defined threshold value. In some embodiments, the method may optionally include sending an alert to a law enforcement related entity that includes image data associated with a vehicle that produces a measured noise level that exceeds a legally defined threshold value. In some embodiments, the method may optionally include sending an alert to a law enforcement related entity that includes image data associated with a vehicle that produces a measured noise level that exceeds a legally defined threshold value and data associated with a measured noise level produced by a vehicle that exceeds a legally defined threshold value. In some embodiments, the method may optionally include sending an alert to a law enforcement related entity that includes license plate associated information associated with a vehicle that produced a measured noise level that exceeds a legally defined threshold value and at least one value for a measured noise level produced by the vehicle that exceeds a legally defined threshold value. In some embodiments, the method may optionally include sending an alert to a law enforcement related entity that includes license plate associated information associated with a vehicle that produced a measured noise level that exceeds a legally defined threshold value, at least one value for a measured noise level produced by the vehicle that exceeds a legally defined threshold value, and a time when the vehicle produced a measured noise level that exceeded a legally defined threshold value.

In some embodiments, a system is provided that may include, but is not limited to, circuitry configured to measure one or more levels of noise, circuitry configured to determine a location where the noise was produced, and circuitry configured to obtain at least one image of the location where the noise was produced. In some embodiments, the system may optionally include circuitry configured to determine a time when a level of noise was measured. In some embodiments, the system may optionally include circuitry configured to process data related to the measured level of noise and data related to an image of the location where the noise was produced to identify the source of the noise. In some embodiments, the system may optionally include circuitry configured to process location data and image data to identify a vehicle as the source of the noise. In some embodiments, the system may optionally include circuitry configured to obtain license plate associated information for a vehicle identified as the source of the noise. In some embodiments, the system may optionally include circuitry configured to analyze a measured noise level to determine if the measured noise level exceeds a threshold value. In some embodiments, the system may optionally include circuitry configured to analyze a measured noise level to determine if the measured noise level exceeds a legally defined threshold value. In some embodiments, the system may optionally include circuitry configured to send an alert to a law enforcement related entity if a measured noise level exceeds a legally defined threshold value. In some embodiments, the system may optionally include circuitry configured to send an alert to a law enforcement related entity that includes image data associated with a vehicle that produces a measured noise level that exceeds a legally defined threshold value. In some embodiments, the system may optionally include circuitry configured to send an alert to a law enforcement related entity that includes image data associated with a vehicle that produces a measured noise level that exceeds a legally defined threshold value and data associated with a measured noise level produced by a vehicle that exceeds a legally defined threshold value. In some embodiments, the system may optionally include circuitry configured to send an alert to a law enforcement related entity that includes license plate associated information associated with a vehicle that produced a measured noise level that exceeds a legally defined threshold value and at least one value for a measured noise level produced by the vehicle that exceeds a legally defined threshold value. In some embodiments, the system may optionally include circuitry configured to send an alert to a law enforcement related entity that includes license plate associated information associated with a vehicle that produced a measured noise level that exceeds a legally defined threshold value, at least one value for a measured noise level produced by the vehicle that exceeds a legally defined threshold value, and a time when the vehicle produced a measured noise level that exceeded a legally defined threshold value.

In some embodiments, a system is provided that may include, but is not limited to, means for measuring one or more levels of noise, means for determining a location where the noise was produced, and means for obtaining at least one image of the location where the noise was produced. In some embodiments, the system may optionally include means for determining a time when a level of noise was measured. In some embodiments, the system may optionally include means for processing data related to the measured level of noise and data related to an image of the location where the noise was produced to identify the source of the noise. In some embodiments, the system may optionally include means for using location data and image data to identify a vehicle as the source of the noise. In some embodiments, the system may optionally include means for obtaining license plate associated information for a vehicle identified as the source of the noise. In some embodiments, the system may optionally include means for analyzing a measured noise level to determine if the measured noise level exceeds a threshold value. In some embodiments, the system may optionally include means for analyzing a measured noise level to determine if the measured noise level exceeds a legally defined threshold value. In some embodiments, the system may optionally include means for sending an alert to a law enforcement related entity if a measured noise level exceeds a legally defined threshold value. In some embodiments, the system may optionally include means for sending an alert to a law enforcement related entity that includes image data associated with a vehicle that produces a measured noise level that exceeds a legally defined threshold value. In some embodiments, the system may optionally include means for sending an alert to a law enforcement related entity that includes image data associated with a vehicle that produces a measured noise level that exceeds a legally defined threshold value and data associated with a measured noise level produced by a vehicle that exceeds a legally defined threshold value. In some embodiments, the system may optionally include means for sending an alert to a law enforcement related entity that includes license plate associated information associated with a vehicle that produced a measured noise level that exceeds a legally defined threshold value and at least one value for a measured noise level produced by the vehicle that exceeds a legally defined threshold value. In some embodiments, the system may optionally include means for sending an alert to a law enforcement related entity that includes license plate associated information associated with a vehicle that produced a measured noise level that exceeds a legally defined threshold value, at least one value for a measured noise level produced by the vehicle that exceeds a legally defined threshold value, and a time when the vehicle produced a measured noise level that exceeded a legally defined threshold value.

In some embodiments, a device is provided that is configured to, but is not limited to, measure one or more levels of noise, determine a location where the noise was produced, and obtain at least one image of the location where the noise was produced. In some embodiments, the device may optionally be configured to include determine a time when a level of noise was measured. In some embodiments, the device may optionally be configured to process data related to the measured level of noise and data related to an image of the location where the noise was produced to identify the source of the noise. In some embodiments, the device may optionally be configured to use location data and image data to identify a vehicle as the source of the noise. In some embodiments, the device may optionally be configured to obtain license plate associated information for a vehicle identified as the source of the noise. In some embodiments, the device may optionally be configured to analyze a measured noise level to determine if the measured noise level exceeds a threshold value. In some embodiments, the device may optionally be configured to analyze a measured noise level to determine if the measured noise level exceeds a legally defined threshold value. In some embodiments, the device may optionally be configured to send an alert to a law enforcement related entity if a measured noise level exceeds a legally defined threshold value. In some embodiments, the device may optionally be configured to send an alert to a law enforcement related entity that includes image data associated with a vehicle that produces a measured noise level that exceeds a legally defined threshold value. In some embodiments, the device may optionally be configured to send an alert to a law enforcement related entity that includes image data associated with a vehicle that produces a measured noise level that exceeds a legally defined threshold value and data associated with a measured noise level produced by a vehicle that exceeds a legally defined threshold value. In some embodiments, the device may optionally be configured to send an alert to a law enforcement related entity that includes license plate associated information associated with a vehicle that produced a measured noise level that exceeds a legally defined threshold value and at least one value for a measured noise level produced by the vehicle that exceeds a legally defined threshold value. In some embodiments, the device may optionally be configured to send an alert to a law enforcement related entity that includes license plate associated information associated with a vehicle that produced a measured noise level that exceeds a legally defined threshold value, at least one value for a measured noise level produced by the vehicle that exceeds a legally defined threshold value, and a time when the vehicle produced a measured noise level that exceeded a legally defined threshold value.

In some embodiments, a system may include, but is not limited to, a sound pressure measuring device, a video camera, and a digital photo camera that are all connected to one or more processors that are configured to process audio and image data. In some embodiments, the one or more processors may be included within an edge system.

In some embodiments, a system may include, but is not limited to, an external sensor placed on, about, underneath, above, or otherwise in position to detect the passing or presence of a vehicle to trigger the system to automatically take a noise measurement. In some embodiments the sensor may be, but is not limited to, a laser, pressure sensor, air pressure sensor, ground-wire sensor, or camera configured to recognize vehicles. In some embodiments, the system may automatically take a noise measurement upon the presence of a vehicle entering an area of passing through an area of roadway. In some embodiments, the system may enter an inactive and/or power-saving state until the external sensor is triggered by the detection of a vehicle or other stimulus configured to wake the system. In some embodiments, the system may be further comprised of a timer, clock, light sensor, or other means of determining time of day to a level of approximation. In some embodiments, the system may be further configured to sleep, wake, activate or deactivate based on a determination of relevant time, such as, but not limited to, to deactivate during time periods when louder noises are legally allowed and activate during hours when noise levels are more strictly enforced.

In some embodiments, the system may be configured to detect a vehicle that produces an offending noise above a set decibel level. Accordingly, in some embodiments, noise registering above a set decibel level will trigger the system to record the sound wave, record a picture of the vehicle and license plate, and record video of the offense as its occurs once the system is triggered. In some embodiments, the system may process data collected from the sound, image, and video-capturing devices in a manner that allows appropriate viewers to recognize exactly how and where a noise offense occurred, providing law enforcement related entities charged with issuing a citation and related courts with evidence for presentation in a legal forum. In some embodiments, data collected may be transmitted to a secure database for secure storage and retrieval to provide for review by law enforcement related entities.

In some embodiments, a system is provided that may include, but is not limited to, a fixed signal-bearing tangible medium bearing one or more instructions to measure one or more levels of noise, determine a location where the noise was produced, and obtain at least one image of the location where the noise was produced. In some embodiments, the system may optionally include a fixed signal-bearing tangible medium bearing one or more instructions to determine a time when a level of noise was measured. In some embodiments, the system may optionally include a fixed signal-bearing tangible medium bearing one or more instructions to process data related to the measured level of noise and data related to an image of the location where the noise was produced to identify the source of the noise. In some embodiments, the system may optionally include a fixed signal-bearing tangible medium bearing one or more instructions to process location data and image data to identify a vehicle as the source of the noise. In some embodiments, the system may optionally include a fixed signal-bearing tangible medium bearing one or more instructions to obtain license plate associated information for a vehicle identified as the source of the noise. In some embodiments, the system may optionally include a fixed signal-bearing tangible medium bearing one or more instructions to analyze a measured noise level to determine if the measured noise level exceeds a threshold value. In some embodiments, the system may optionally include a fixed signal-bearing tangible medium bearing one or more instructions to analyze a measured noise level to determine if the measured noise level exceeds a legally defined threshold value. In some embodiments, the system may optionally include a fixed signal bearing tangible medium bearing one or more instructions to send an alert to a law enforcement related entity if a measured noise level exceeds a legally defined threshold value. In some embodiments, the system may optionally include a fixed signal-bearing tangible medium bearing one or more instructions to send an alert to a law enforcement related entity that includes image data associated with a vehicle that produces a measured noise level that exceeds a legally defined threshold value. In some embodiments, the system may optionally include a fixed signal-bearing tangible medium bearing one or more instructions to send an alert to a law enforcement related entity that includes image data associated with a vehicle that produces a measured noise level that exceeds a legally defined threshold value and data associated with a measured noise level produced by a vehicle that exceeds a legally defined threshold value. In some embodiments, the system may optionally include a fixed signal-bearing tangible medium bearing one or more instructions to send an alert to a law enforcement related entity that includes license plate associated information associated with a vehicle that produced a measured noise level that exceeds a legally defined threshold value and at least one value for a measured noise level produced by the vehicle that exceeds a legally defined threshold value. In some embodiments, the system may optionally include a fixed signal-bearing tangible medium bearing one or more instructions to send an alert to a law enforcement related entity that includes license plate associated information associated with a vehicle that produced a measured noise level that exceeds a legally defined threshold value, at least one value for a measured noise level produced by the vehicle that exceeds a legally defined threshold value, and a time when the vehicle produced a measured noise level that exceeded a legally defined threshold value.

In one or more various aspects, means include but are not limited to circuitry and/or programming for effecting the herein referenced functional aspects; the circuitry and/or programming can be numerous combinations of hardware, software, and/or firmware configured to effect the herein referenced functional aspects depending upon the design choices of the system designer. In some embodiments, means include hardware. In addition to the foregoing, other system aspects means are described in the claims, drawings, and/or text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein referenced method aspects depending upon the design choices of the system designer. In some embodiments, systems include hardware. In addition to the foregoing, other system aspects are described in the claims, drawings, and/or text forming a part of the present application.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices, systems, and/or processes and/or other subject matter described herein will become apparent in the teachings set forth herein.

BRIEF DESCRIPTION OF THE DRAWINGS

Embodiments of the present invention are described in detail below with reference to the following drawings.

DETAILED DESCRIPTION

This invention relates generally to a device and method for detecting and penalizing noise violations. Specific details of certain embodiments of the invention are set forth in the following description and in FIGS. 1-11 to provide a thorough understanding of such embodiments. The present invention may have additional embodiments, may be practiced without one or more of the details described for any particular described embodiment, or may have any detail described for one particular embodiment practiced with any other detail described for another embodiment.

Figure 1:
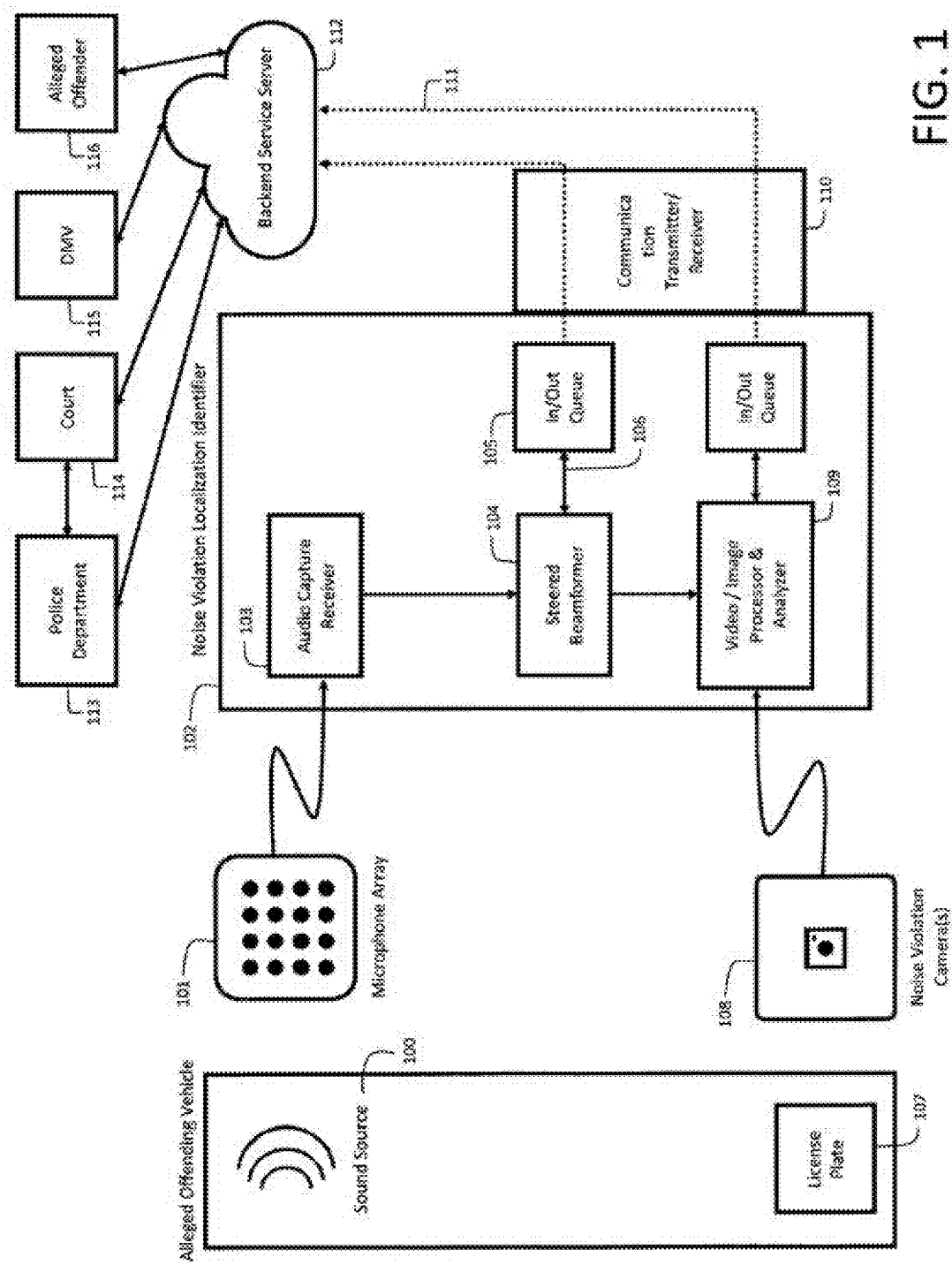
FIG. 1 is an overall system design block diagram of the noise violation localization identifier system, illustrating how each of the physical components, logical components, software, backend service server, stakeholders, and the alleged offender connect together, in accordance with an embodiment of the invention.

FIG. 1 is an overall system design block diagram of the noise violation localization identifier system illustrating how each of the physical components, software components, backend service server, stakeholders, and the alleged offender 116 connect together. Physical components include one or more noise violation cameras 108, one or more microphone arrays 101, one or more noise violation localization identifiers 102, one or more license plates 107, and one or more communication transmitter/receivers 110. Software utilizing components include one or more audio receivers 103, one or more steered beamformers 104, in/out queue 105, one or more video/image processors and/or analyzers 109, and the output information sent to the one or more backend service servers 106 and 111. Information associated with the alleged offending vehicle can include the vehicle's license plate 107 as well as the alleged offending vehicle's sound source 100. The one or more backend service servers 112 may be used to determine if a vehicle is in violation of a noise-related law and/or ordinance, be used to provide information related to how an alleged offending vehicle is tracked issued a citation from one or more law enforcement related entities (e.g., department of motor vehicles 115 and/or police department 113), and how the citation may be evaluated by the court system 114 to be upheld, reduced, or rejected.

When an alleged offender 116 creates a noise disturbance as one or more sound sources 100, the audio may be captured by one or more multi-channel microphone arrays 101. In some embodiments, such one or more multi-channel arrays 101 may include an array of eight microphones (eight channels) or more in a grid configuration. In some embodiments, one or more multi-channel arrays 101 may include two or more microphones. Additional microphones may increase both accuracy and precision due to later interferometry processes. In some embodiments, one or more multi-channel arrays 101 may include two or more microphones to enable sound localization via beamforming. However, in some embodiments, other techniques may be used to localize sound. While some embodiments call for omnidirectional microphones to enable sound localization via beamforming, alternate embodiments using other microphone types are also successful at sound localization via other techniques, such as shotgun microphones and scanning. Grids of microphones are shown to allow capture of audio either in spherical space, or on a plane.

The multi-channel audio may be captured in either analog or digital format by the microphone array 101, and transmitted to the one or more noise violation localization identifiers 102 by way of the one or more audio capture receivers 103. The audio can be transmitted over any supported medium, such as Bluetooth, conductive wire, optical wire, and other embodiments, while one embodiment utilizes conductive wire. The one or more audio capture receivers 103 may receive multi-channel audio in analog and/or digital format, sample the incoming audio, and then store & forward the information to the one or more steered beamformers 104.

The one or more steered beamformers 104 may receive digitized & sampled audio from the one or more audio capture receivers 103 for use in locating all sources of audio, and increasing accuracy of the sound localization via an interferometer. In some embodiments, the location of the audio source may be determined through use of Delay and Sum beamforming. Other methods may also be used. These methods may include, but are not limited to, Phase delay beamforming, binaural hearing, Multiple Signal Classification (MUSIC), neural networks, acoustic vector sensor arrays, and the like. Using the audio samples from each microphone channel, as well as the number of channels, the steered beamformer 104 will find the location of audio sources in the acoustic environment sent as a sound map 106 out the in/out queue 105, the Communication Transmitter Receiver 110, and out to the one or more backend service servers 112. Additionally, the one or more steered beamformers 104 can identify if a sound source 100 violates the legal sound thresholds of a municipality in which the noise violation occurred, and trigger the one or more video/image processor and/or analyzers 109 to take a picture.

The one or more video/image processor and/or analyzers 109 will be triggered by the one or more steered beamformers 104 when a noise violation is heard that is over a legal threshold. This triggers the one or more video/image processor and/or analyzers 109 to capture multiple images and video via the noise violation cameras 108 with the aim of producing evidence of the scene that may be used by law enforcement entities. Depending on the legal requirements to issue a citation, one or more of the images may be used in the citation, as well as a variable time window of video. The one or more video/image processor and/or analyzers 109 will find vehicles in the scene, will find the allegedly offending vehicle in the scene, as well as identify the license plate 107 of the offending vehicle. The one or more video/image processor and/or analyzers 109 will send out all image, video, and license plate evidence out the in/out queue 105, the one or more communication transmitter/receivers 110, and eventually out to the one or more backend service servers 112.

The one or more communication transmitter/receivers 110 provides a medium and protocol to transfer relevant noise violation evidence to the one or more backend service servers 112. This provides for reliability, authenticity, and security of data sent, even if the downstream connection is intermittent or lost. In some embodiments, the noise violation evidence may be sent over cellular or a wired ethernet connection 111. However, other methods and systems may be used to send noise violation related data, such as Bluetooth, Wireless, Wire-line, Optical systems, Near-field Communications, or others.

The one or more backend service servers 112 provides an interaction point for all various stakeholders—the police department 113, the court 114, the DMV/state departments 115, the alleged offender 116, and other law enforcement related entities. There are multiple methods to transmit the violation data to the various stakeholders including the alleged offender 116, the court 114, the police force, the DMV, and the state departments. These include issuing a citation to the alleged offender 116, providing violation information to the court 114, providing methods to investigate the violation to the police force, and allowing the appropriate state departments to view violations.

The manner in which a citation is issued may vary between jurisdictions based on their laws. Some jurisdictions allow citations to be issued based on objective criteria, while other jurisdictions allow citations to be issued based on subjective criteria. Additionally, some jurisdictions require training the police force to issue proper citations, whereas others will not. The system can be modified as needed to suit the requirements and needs of jurisdictions to ensure legally proper issuing of citations.

In some embodiments, violation related information may be transmitted by the one or more backend service servers 112, the police department 113, and the court 114 to the proper agencies. Agencies, such as the DMV 115 or equivalent state department, will receive this violation related information on a system they maintain, and retain this violation related information for their own records. The DMV 115 or equivalent local department will decide whether or not an offender has paid their fines according to the citation issued, and whether to take further action.

Various jurisdictions may have different standards by which they determine a standard threshold by which a court 114 can decide if a civil infraction has occurred and can be upheld. The police department 113 may provide a citation with associated case number and proper evidence to the court 114, as well as to the alleged offender 116. The accused can challenge the citation in court 114, it is then up to the judge to review the evidence provided by the police officer to see if the citation should be upheld, reduced, or dismissed altogether.

The court 114, city attorney or judge may access data gathered by the one or more backend service servers 112. This data is the same that a police officer used to evaluate the violation. The court 114 may review this information, as well as the police officer's interpretation of that information to see if the citation should be upheld, reduced, or rejected. In some embodiments the presentation of the data may be modified in order to meet the needs of the court 114, city attorney or judge, without changing the data itself.

The appropriate state department 115, city, or court 114 administration may review the one or more backend service servers 112 case management system to evaluate the status of a citation, and whether further action must be taken against an accused offender in the case of delinquent payment.

The alleged offender 116 is given the right and opportunity to review the data the one or more backend service servers 112 collects of their citation.

Police departments 113 authenticate and access the collected data to assess if it violates city, state, or county code and thus will issue a citation to the alleged offender 116.

Figure 2:
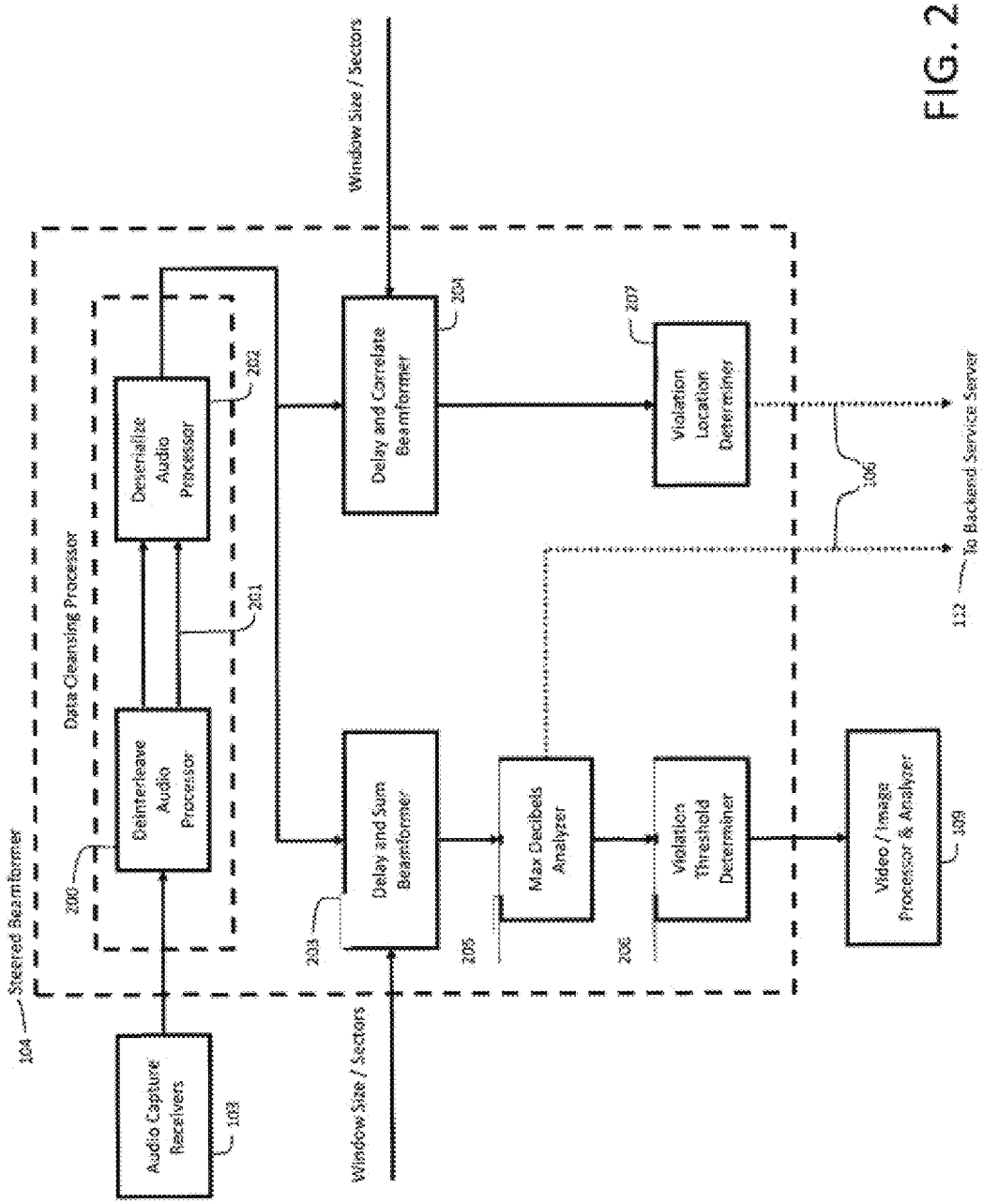
FIG. 2 illustrates a detailed block diagram of the Steered Beamformer, which provides the sound localization information as a sound map, based on the noise produced by the alleged offending vehicle, in accordance with an embodiment of the invention.

FIG. 2 describes an in-depth block diagram of the one or more steered beamformers 104. The one or more steered beamformers 104 is made up of logical components that at a high level receive digitized and sampled audio from the one or more audio capture receivers 103 and use them to locate audio sources. The one or more steered beamformers 104 performs a number of data cleansing & preprocessing steps to prepare the audio information for further analysis. After pre-processing the sampled audio, the one or more steered beamformers 104 performs analysis on all audio channels received. This analysis is to both identify the location of audio sources within an environment, as well as identify the magnitude of audio sources to compare them against the legal noise thresholds in decibels, and trigger a noise violation workflow in the one or more video/image processor and/or analyzers 109.

Raw audio is captured, sampled, digitized, and serialized in the one or more audio capture receivers 103, then passed into the one or more steered beamformers 104 to be deinterleaved by the one or more deinterleave audio processors 200. This audio is received in an interleaved format, although any interleaving or interlacing embodiments are suitable. The chosen embodiment is to support a standard Pulse-code modulation (PCM) interleaved modulation method. Interleaving is the process of combining all audio channels in a round-robin format into a one-byte stream. This byte stream will be deinterleaved by the deinterleave audio processors 200, and split into N number of audio objects 201 where N is the number of microphones (and thus number of channels). In some embodiments, two channels 201 may be supported to perform delay and sum beamforming, and are shown as an embodiment in FIG. 2, while other embodiments may use eight or more channels.

After the audio is deinterleaved into each of its channels by the one or more deinterleave audio processors 200, it is prepared into a data object for processing by the one or more deserialize audio processors 202. This creates a common audio data object for the downstream analytics components to consume: one or more delay and sum beamformers 203 and one or more delay and correlate beamformers 204. While a data object is not necessary, it provides for ease during further analytics, and is one approach for structuring data. These audio data objects for each of the eight channels are sent in parallel to both the one or more delay and sum beamformers 203 and one or more delay and correlate beamformers 204 for analysis.

The purpose of the one or more delay and sum beamformers 203 is to discern spatial sources of audio from a combination of the microphones used in the array. One embodiment that may be used to identify the location of this audio source is delay and sum beamforming, although other embodiments can be used: such as phase delay beamforming, binaural hearing, Multiple Signal Classification (MUSIC), neural networks, acoustic vector sensor arrays, and others to a lesser affect. Using the audio samples from each microphone channel, as well as the number of channels, the one or more steered beamformers 104 are capable of finding the location of audio sources in the acoustic environment. In some embodiments this is accomplished by "steering" the one or more beamformers 104. Steering a beamformer 104 is done by focusing on individual sectors of the spatial and acoustic environment (e.g., sector 0 is from 0-4 degrees, sector 1 is from 4-8 degrees, sector 2 is from 8-12 degrees, and so on.)—this focusing is accomplished by delaying audio to each microphone by the amount of time audio is known to arrive at each microphone, which is the distance between microphones divided by the speed of sound in air. In some embodiments this assumes sound comes from a particular direction, resulting in the audio being delayed to each microphone (e.g. microphone A+0 seconds, microphone B+8 milliseconds, microphone C+16 milliseconds). Audio sources from each microphone may then be summed across each audio channel at their delayed times, then divided in magnitude to get a new collective "Steered" audio source from that specific sector. This action may be repeated for all vertical and horizontal sectors, creating a complete sound map 106 of the acoustic environment, which allows sound sources 100 within the acoustic environment and their magnitudes to be identified.

The sound map 106 of audio sources generated from the one or more delay and sum beamformers 203 is passed to additional components of the system for inspection of each audio sector of the sound map 106, specifically the one or more max decibels analyzers 205 and the one or more violation threshold determiners 206. The purpose of this additional analysis is to identify the maximum audio threshold at each sector for a window of time, and then compare that incoming audio source to the legal sound threshold indicating a noise violation occurred. The one or more max decibels analyzers 205 may take raw quantized audio and convert the sound level to decibels in one embodiment. However, virtually any audio format embodiment may be sufficient for this step. This conversion to decibels is done by creating a 3rd order polynomial equation to move from raw audio to decibels, by comparing against a sound pressure monitor calibrated to American National Standards Institute (ANSI) and International Electrotechnical Commission (IEC) 61672-1 Type 2 standards which is in compliance to the municipal law in which the device is located. The raw audio may be converted to decibels by applying a 3rd order polynomial equation, although any conversion equation embodiment will be sufficient if it meets the municipal requirements for accuracy. Lastly, the maximum decibel level is calculated by averaging across multiple local maximums in a 1 second audio window, which is then passed to the one or more violation threshold determiners 206.

After converting the raw audio to decibels and finding the maximum decibel level in the one or more max decibels analyzers 205, the audio is passed to the one or more violation threshold determiners 206. The one or more violation threshold determiners 206 compares the decibel level received from the alleged offender's vehicle to the local municipal law in which a violation would be issued. Laws vary from municipality to municipality, so the one or more violation threshold determiners 206 will know which laws apply to the current municipality, along with any special considerations therein. If a noise violation was detected by the one or more violation threshold determiners 206, it will communicate with the one or more video/image processor & analyzers that a violation occurred, the time that it occurred, and will provide the sound map 106—such that the sound map 106 can be compared against images and video to capture the alleged infracting vehicle and license plate 107. The sound map 106 will also be sent to the one or more backend service servers 112 to be used by the police department as evidence that a violation occurred.

Two sources of data are captured to construct the sound map 106, the magnitude of audio in decibels, and the probability that audio came from a specified sector. The one or more delay and sum beamformers 203 captures the magnitude of audio, in the form of decibel level as described above. The one or more delay and correlate beamformers 204 captures the probability that audio came from a particular sector, as further evidence for the police department 113 and court 114.

The goal of the one or more delay and correlate beamformers 204 is to locate the source of sound to provide support for the allegation with a certain probability that the noise violation came from a specified vehicle. Similar to the one or more delay and sum beamformers 203, the one or more delay and correlate beamformers 204 "steers" audio coming from individual sectors by delaying audio to each microphone as described above. Instead of aggregating audio samples as in the one or more delay and sum beamformers 203, the one or more delay and correlate beamformers 204 uses a correlation algorithm to see how similar audio appears across each microphone. The more similar audio appears in a given sector for each microphone, the higher probability the audio came from that sector. A standard correlation algorithm is used in some embodiments but any embodiment that can sufficiently perform correlation would be sufficient. The Pearson Correlation coefficient is used in this embodiment to correlate sound sources, by using multiplication to understand if sound sources correlate. When sound sources are highly correlatable, their phase lines up in the time domain—when two sound sources correlate and are multiplied together, they make a larger resultant sound wave. It is possible to use this knowledge and perform piecewise multiplication of each sample to show if it highly correlates and equals probability 1, does not correlate and equals probability 0, or negatively correlates and equals probability −1.

The resultant probabilities from the one or more delay and correlate beamformers 204 are sent as part of the sound map 106 to the one or more violation location determiners 207. The one or more violation location determiners 207 determines which sectors are the most likely to be where a noise violation occurred. It finds this likelihood by ranking each sector in the sound map based on its probability, finds local maximums, then sorts by the most likely sound sources out of the acoustic environment. This determination can then be further confirmed by comparing the results to images or other maps of the local area at the time of the noise violation, such as maps created by, but not limited to, radar, visual, or infrared imaging.

The complete sound map 106 is a collection of audio sectors mapped to the real-world space, decibel levels at each sector, location of noise violations at each sector, and aggregate audio at each sector. This sound map 106 provided by both beamformers (203 and 204) is sent to the one or more backend service servers 112 to be used by the police department 113 as evidence of a violation.

Figure 3:
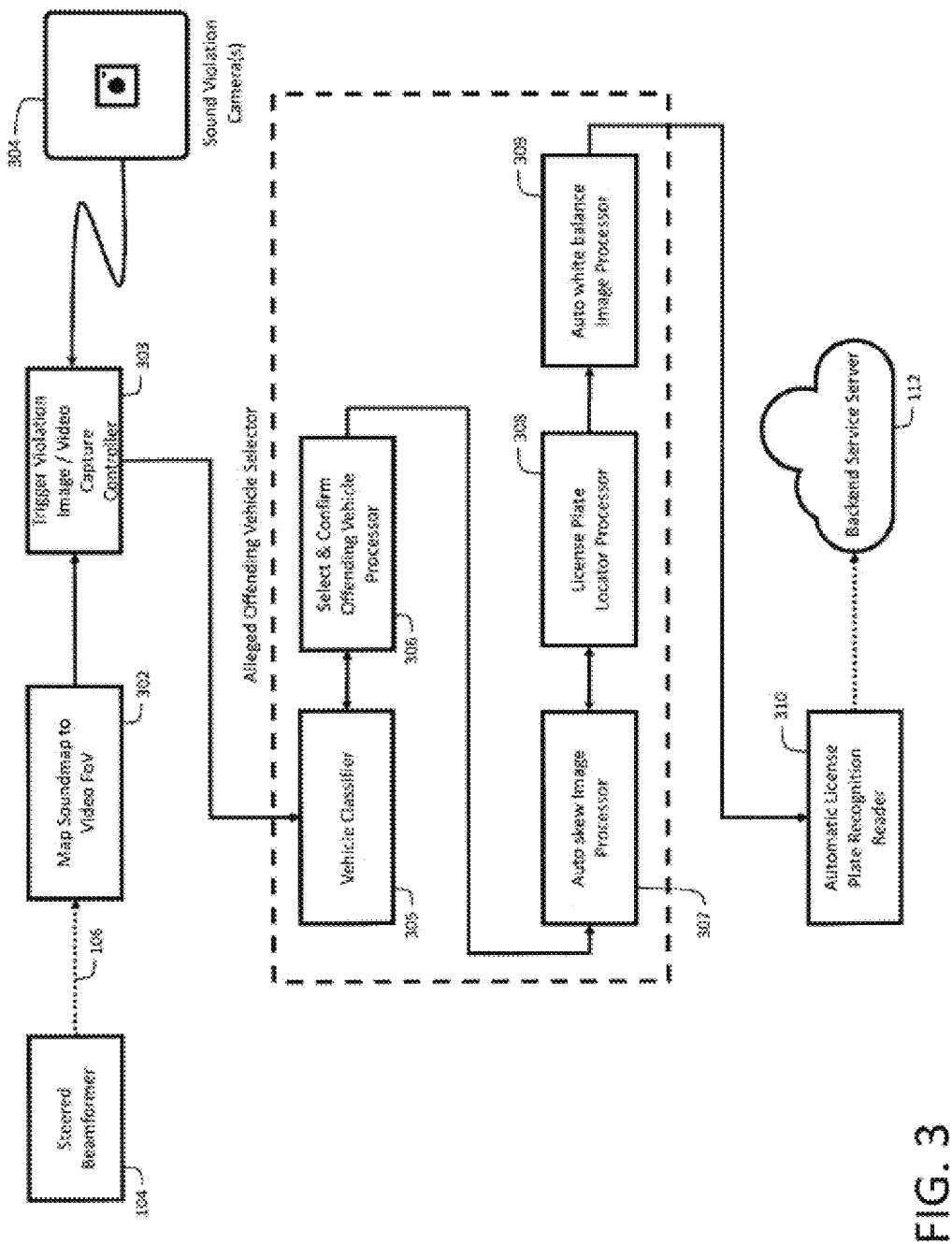
FIG. 3 illustrates a detailed block diagram of the Video/Image Processor and Analyzer, which correlates a picture of the environment (including an alleged offending vehicle), and correlates it with the sound map, to identify the license plate of the allegedly offending vehicle, in accordance with an embodiment of the invention.

FIG. 3 describes an in-depth block diagram of the one or more video/image processor and/or analyzers 109. The one or more video/image processor and/or analyzers 109 may include logical software components, image processing components, image analysis components, machine learning models, and a hardware video camera(s) with the purpose of identifying offending vehicles, their license plate, and the license plate characters in an image. The one or more video/image processor and/or analyzers 109 performs image processing steps to prepare the video and image for further analysis. In some embodiments, the one or more video/image processor and/or analyzers 109 may correct environmental affectations on an image such as image skew and image over exposure. The one or more video/image processor and/or analyzers 109 may receive one or more audio sound maps which include audio threshold and location information from the one or more steered beamformers 104 and images from the One or more sound violation cameras 304. The one or more video/image processor and/or analyzers 109 will then output an image of the offending vehicle, an image of the offending vehicle's license plate 107, and distinguishing features of the license plate that may include, but are not limited to, colors, pictures, numbers, letters, and/or other the alphanumeric characters identified in the license plate to the one or more backend service servers 112.

A sound map 106 is received from the one or more steered beamformers 104 as a collection of audio sectors mapped to the real-world space, decibel levels at each sector, location of noise violations at each sector, and aggregate audio at each sector. This Sound map 106 needs to be pre-processed with a map sound map to video field of view (FoV) 302 as a first step. Audio sampled from the microphones may be received omnidirectionally in one embodiment and will subsequently narrow this audio field of view to 180 degrees focusing on the full field of view of the alleged offender(s) 116. Typically, video camera field of view will not match up with the audio field of view, and thus needs to be cropped and mapped. The purpose of the map sound map to video FoV 302 is to crop and remove any audio sources that exist outside of the video camera field of view, which is typically narrower than audio field of view, then to appropriately map audio sources found in the sound map to their video counterpart.

After mapping audio to video, the system will determine if any sound sources exceed the legal limit for a noise violation, and if so, trigger an image to be taken with the one or more trigger violation image/video capture controllers 303. This controller 303 interfaces with one or multiple one or more sound violation cameras 304. In some embodiments, two or more cameras may be triggered, both configured in a wide-angle view. Additionally, this embodiment calls for both two or more cameras to be configured with the same Field of View, the same capture rate, same resolution, and same azimuth & vertical angle for each picture, with the only difference being the lens filter applied to each camera. One camera is intended to capture the closest color reproduction and feature reproduction as a user would expect from a normal camera. To do this an infrared (IR) filter is applied to the camera simulating a human eye which cannot see infrared. The other camera is calibrated to capture license plates in day or night time, by having its IR filter removed for better night visibility, and replaced with a below-IR filter so that license plates have higher contrast. In some embodiments, different filters or forms of detection may further supplement and/or modify the two or more cameras, depending on the situation and needs.

Throughout operation, the system is always capturing video in a circular buffer, to provide the police department 113, court 114, and alleged offender 116 with a time-boxed video to understand the context around the alleged violation. This video is timestamped along with alleged violations and sent to the one or more backend service servers 112.

The image captured when a violation occurs is then sent to the alleged offending vehicle selector, which is a collection of components which will detect the allegedly offending vehicle amongst all vehicles, as well as the license plate of said vehicle. The image is first passed to the one or more vehicle classifiers 305. The one or more vehicle classifiers 305 will take a machine learning model which is trained to classify objects as vehicles and execute this model against the image to locate all vehicles in the image. In other embodiments, alternative methods can be used to detect features, vehicles, and colors to provide the same effect, such as utilizing computer image recognition techniques.

Once all vehicles are identified in the image, the results are used along with the sound map 106 to identify the allegedly offending vehicle within the select & confirm offending vehicle processor 306. This is done by matching all audio sources within the sound map that exceed legal noise limits, along with their locations, against the locations of vehicles provided by the one or more vehicle classifiers 305. These two pieces of information along with the probability of a sounds location from the sound map, are provided as evidence to the police department 113 and court 114 of a noise violation. Using this information, the image is cropped to display the allegedly offending vehicle and is then passed to the next component of the system.

This cropped image of an allegedly offending vehicle then needs to go through image processing to extract the license plate. The image processing chosen here, as one embodiment among many, is the process of deskewing via the one or more auto deskew image processors 307. Deskewing is important for further character recognition, as optical character recognition requires characters directly facing the viewer, as if being read. Deskewing is the process of removing skew by rotating the image in the x, y, and z plane. These rotation parameters are obtained by using rotational features in the image, as well as known environmental parameters, such as the slope in a road, directionality of moving vehicles, and distance to a vehicle.

Once the image is deskewed, the license plate on the vehicle must be found via the one or more license plate location processors 308. The one or more license plate location processors 308 takes a deskewed image and can locate a license plate using multiple methods, such as a license plate classifier and an object detection algorithm to find corners. Once the location of the license plate is detected, the license plate image is cropped out and passed to downstream system components for further image processing.

The cropped and deskewed license plate image is finally passed to the one or more auto white balance image processor 309 for the final image processing step. The purpose of the one or more auto white balance image processor 309 is to ensure text on a license plate has proper contrast with its background such that it can be analyzed with an optical character recognition algorithm. It is important to white balance the image to gain enough contrast between license plate text and the background of the license plate. There are numerous environmental causes which make this step necessary, such as headlights at night overexposing an image and reflected light overexposing or underexposing an image. The one or more auto white balance image processor 309 differs from traditional white balancing, as it can perform localized white balancing using knowledge of where the sound sources are located, and thus where the vehicle and license plate are located, to white balance the appropriate parts of the image. This completes image processing and localization of key features in the image, specifically the allegedly offending vehicle, and the license plate of the vehicle, to be analyzed by downstream system components. In some embodiments, traditional white balancing may be utilized independently or as a redundancy to improve the accuracy of the reading.

The deskewed and white balanced license plate is then analyzed by the one or more automatic license plate recognition readers 310. The one or more automatic license plate recognition readers 310 uses standard automatic license plate reader (ALPR) techniques to find the characters of the license plate along with the accuracy of the algorithms analysis. These license plate characters, along with the license plate image, the image of the vehicle, and the video of the vehicle, are provided to the police department 113, court 114, and alleged offender 116 via the one or more backend service servers 112, to be used as further evidence of a violation having occurred.

Figure 4:
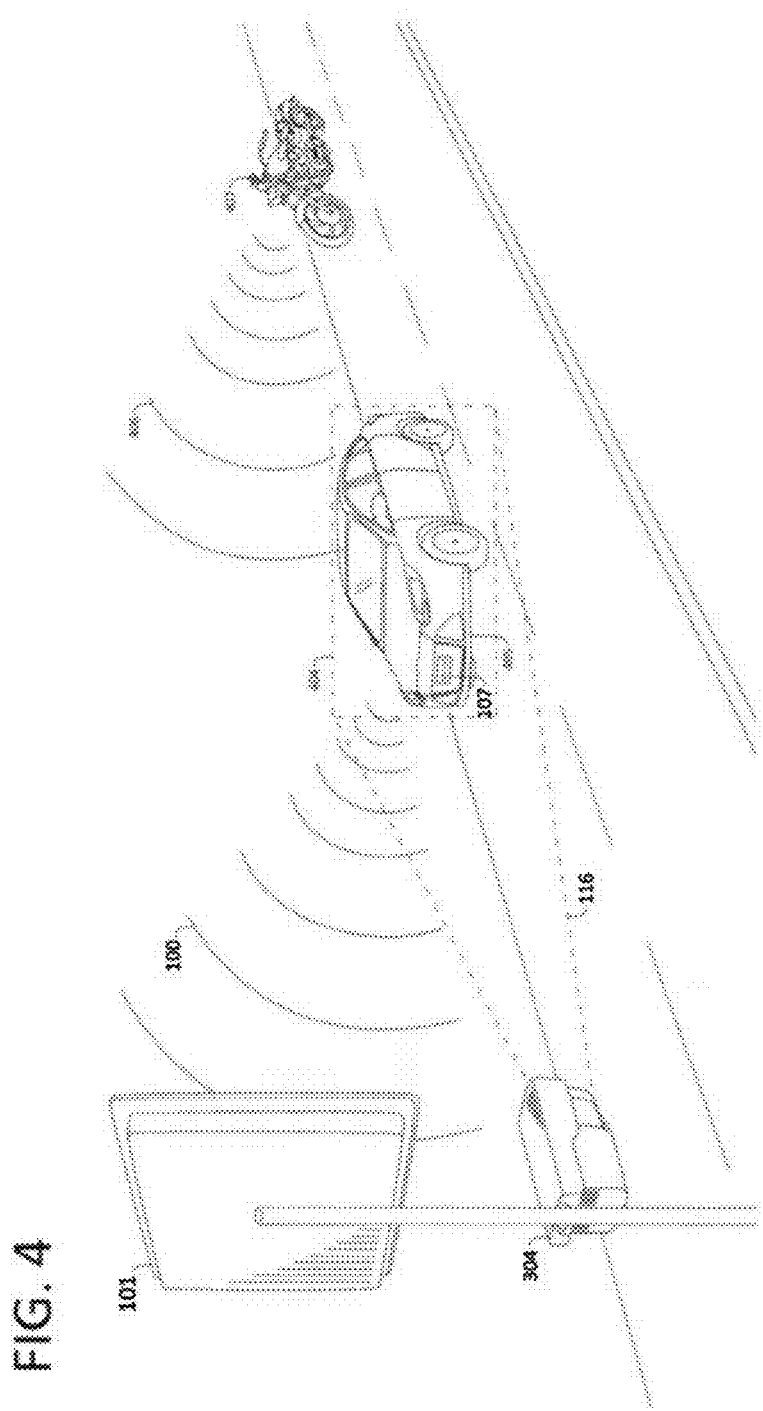
FIG. 4 shows a perspective view of the entire system—capturing evidence of an allegedly offending vehicle. This includes a picture and video of the environment, a picture of the allegedly offending vehicle, a picture of the license plate, a recording of the alleged noise violation, a correlation between the acquired audio and video information, and related metadata, in accordance with an embodiment of the invention.

FIG. 4 is a perspective image illustrating a real-world scenario of a noise violation occurring, being detected by the microphone array, and subsequently captured by the camera system. This system will exist along streets, street corners, intersections, or any location where noise violations could be captured. The scenario shown in FIG. 4 is an example of two vehicles driving on a street; a car 405 creating noise loud enough to trigger a violation and a motorcycle 407 creating noise not loud enough for a violation. The one or more microphone arrays 101 is capturing all sources of sounds, triggering on the sound source 100 emanating from the car 405, capturing a picture with the one or more sound violation cameras 304, and performing subsequent analysis on the image to extract the license plate 107 from the image. The orientation, shape, and form of the one or more microphone arrays 101 and one or more sound violation cameras 304 are only used as demonstration purposes to show the capture of sound sources and the capture of images and video, and are only one embodiment of the form the system could take.

In the example shown, the car 405 emits noise 402 above the legal limit while the motorcycle 407 is emitting noise 406 not over the legal limit. Both sound sources are captured by the one or more microphone arrays 101, but only the noise being emitting from car 405 exceeds legal limits and will trigger the noise violation detection process.

The one or more microphone arrays 101 will listen to all sound sources in the acoustic environment in one embodiment. However, alternate embodiments exist that include directional microphones, vector microphones, and a mix of one or more varieties of microphone types. In one embodiment, of all sound sources, only those emanating from a vehicle in the street are assessed for violations. The one or more microphone arrays 101 will differentiate between all audio sources, their magnitude in decibel, and their spatial location. Using this information, the one or more microphone arrays 101 will only trigger noise violations that occur over the municipally defined legal threshold, and will not trigger violations from other sound sources below the legal threshold. In the example shown, the car 405 emits sound source 100 and the motorcycle 407 emits sound source 406 both of which are captured by the one or more microphone arrays 101. The system will evaluate all sounds sources captured and only trigger a noise violation on the car sound source 100.

The one or more sound violation cameras 304 may capture video of the entire environment 403 for evidence collection such that a police department 113, court 114, and alleged offender 116 can get accurate context of the conditions leading up to, during, and after the noise violation occurs. Additionally, this video will be paired with audio of the noise violation including the calibrated decibel level measured such that the police department 113, court 114, and alleged offender 116 can determine if a violation has occurred.

The triggered violation from the car 405 causes video and images to be captured by the one or more sound violation cameras 304. This image and video may be a picture of the entire environment 403, including the allegedly offending vehicle. All vehicles in the scene are identified, and matched with the sound sources detected by the system, to identify the violating vehicle (or vehicles) specifically. While this is a preferred embodiment to match image and sound information to identify vehicles, it is possible to only use audio information to approximate the vehicles location, or a mix of other location and identification techniques using alternative detection means. Using this noise violation identification information within the sound map, the image is subsequently cropped to provide a picture of only the alleged offender's vehicle 404. Within the picture of the alleged offender's vehicle 404 the image is further analyzed to detect the license plate 107 of the offending vehicle. The image of the license plate 107 is analyzed using optical character recognition to recognize the characters of the license plate 107. Many embodiments and techniques can be used both in pre-processing of the information, as well as techniques to recognize characters. One embodiment supported will pre-process the image in the form of de-skewing, binarization, despeckle, normalization, etc., and then use the feature extraction technique paired with nearest neighbor classifiers to recognize characters.

The output of this example is evidence and metadata of the noise violation sent to the one or more backend services servers 112 and police department 113, court 114, alleged offender 116, and state department. This evidence includes, but is not limited to, a video of the entire scene including the alleged offender 116, an image of the scene including the alleged offender 116, a cropped image of the alleged offenders vehicle 404, a cropped image of the alleged offenders license plate 107, recordings of all sound sources 100 and 406, and sound metadata information in the form of a sound map which includes spatial locations of sound sources, magnitudes of the sound sources in decibels, the probability sound came from a particular location, time of day via RFC 3339, and other situation-specific metadata required as part of local municipal laws.

The criteria for what constitutes an illegal vehicle noise violation will vary based on the laws of a given municipality. The criteria will range from subjective (e.g. "The creation of frequent, repetitive or continuous sounds in connection with the starting, operation, repair, rebuilding or testing of any motor vehicle, motorcycle, off-highway vehicle, or internal combustion engine, within a rural or residential district, so as to unreasonably disturb or interfere with the peace.") to objective (e.g. "It is unlawful for any person to operate upon any highway any motor vehicle or any combination of motor vehicles under any conditions of grade, load, acceleration or deceleration in such a manner that the motor vehicle's exhaust noise exceeds 95 decibels."). Under objective criteria, additional variables may be taken into consideration when determining whether a vehicle is producing an illegal noise infraction, including: type of vehicle (e.g. motorcycle, standard car, garbage truck), year vehicle was manufactured, weight of vehicle, where the vehicle was located at the time the vehicle was emitting the noise, and the time of day when the vehicle was emitting the noise. In some embodiments, the system may be able to adhere to both subjective and objective standards per the discretion and instruction of the municipality, and it may be adjusted to include in its algorithm the aforementioned additional variables. In some embodiments, the system may be configured to dynamically understand objective criteria (such as time of day) and subjective criteria, automatically adjust the violation threshold, as well as log and present the infraction criteria used for police departments, courts, and municipalities.

In some embodiments, the system may have broader applications beyond helping local police and municipalities enforce vehicle noise laws. Other applications include, but are not limited to, gunshot triangulation, the monitoring and code enforcement of construction noise, industrial and factory noise, indoor and outdoor entertainment venue noise, and air traffic noise, noise data collection for use by third-party organizations such as for-profit businesses, academic institutions, and city planning departments, and inclusion into a variety of military operations that require noise detection and monitoring.

Future iterations of this system may have the ability to record and classify frequency 'signatures' for vehicles, identifying the make and model of a given vehicle, as well as its engine and muffler model based off of the frequency signature detected.

Figure 5:
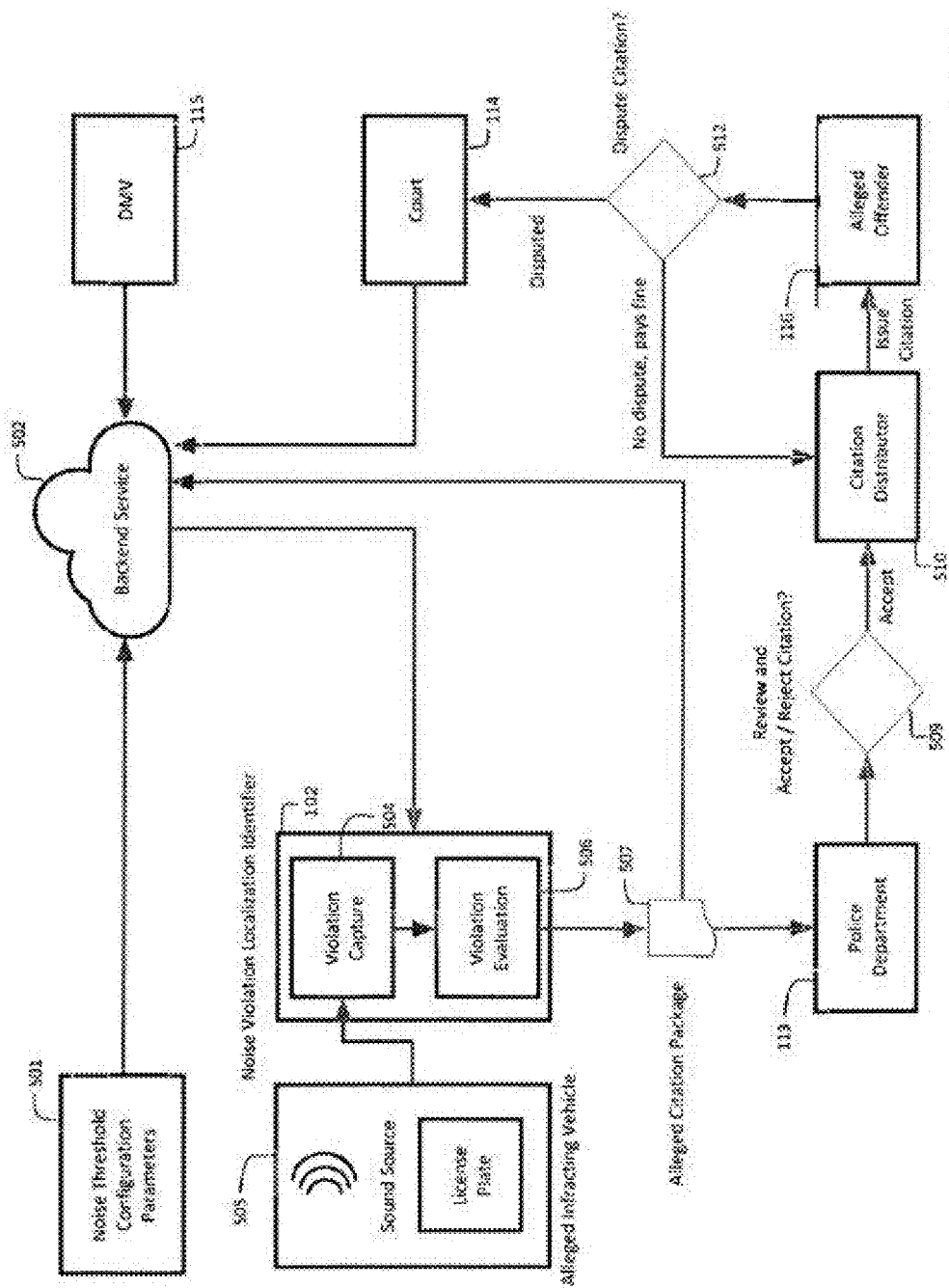
FIG. 5 is a process flow diagram showing the flow of an alleged citation, in accordance with an embodiment of the invention.

FIG. 5 is a detailed process flow diagram showing the flow of an alleged citation, specifically showing how municipal/state/county law is tied to the triggering of a citation, how the device processes said violation, and how the violation is bubbled up to the relevant municipal organizations as well as the offender for proper resolution. For this figure, physical components include the one or more noise violation localization identifiers 102 and the alleged infracting vehicle 505. Software components include the one or more noise threshold configuration parameters 501, the one or more backend services 502, the one or more violation capture modules 504, the one or more violation evaluation modules 506, and the one or more alleged citation packages 507. Parties represented in this figure include the police department 113, the citation distributor 510, the alleged offender 116, the courts 114, and the appropriate state departments/DMV 115.

In the process flow diagram shown, one or more noise threshold configuration parameters 501 are either manually or automatically sent to the one or more backend services 502 depending on the state/city/or county in which the device is one or more noise violation localization identifiers 102 is operating. These parameters are typically a decibel threshold by which a noise violation would have to cross to be labeled a violation, the distance the noise should be measured by, the type of environment in which the device is operating, and the class of vehicle being measured, among others.

The one or more backend services 502 then automatically or manually updates any relevant one or more noise violation localization identifiers 102 by passing the new parameters 501 to the unit. From here, the one or more violation capture modules 504 within the one or more noise violation localization identifiers 102 actively listens for any violations based on the passed parameters.

When the one or more violation capture modules 504 detects a violation from an alleged infracting vehicle 505, a set of information is captured which makes up the one or more alleged citation package 507 including the relevant audio, video, photos, environmental & system metadata, license plate information, and any additional information needed for the citation package. This information is then evaluated internally in the device, although other implementations would support a user manually evaluating this information, for correctness and appropriateness. These evaluations can include verifying the noise thresholds were properly exceeded, the vehicle is of the correct class, the license plate matches the vehicle and was read correctly, the audio tracked the appropriate vehicle, among other valida-

TABLE I

An example of both normal noise and noise violations is seen below:

| Infraction ID | Date/Time | Sound Pressure | Sound Accuracy | Frequency | License Plate | Plate Confidence | Location | Video | Violation duration | Sensor ID |
|---|---|---|---|---|---|---|---|---|---|---|
| 4523 | 2017-27-07 0900:14 | 100 dB | 89% | 415 Hz | F45T1 | 88% | 8$^{th}$ and Market | 30 s | 15 s | 38 |
| 4524 | 2017-27-07 0915:25 | 82 dB | 94% | 120 Hz | ABC123 | 85% | 47.6101° N, 122.2015° W | 25 s | 20 s | 39 |
| 4525 | 2017-27-07 1420:33 | 55 dB | 98% | 400 Hz | DEF456 | 92% | 26$^{th}$ and Yesler | 25 s | 15 s | 40 |
| 4526 | 2017-28-07 0800:40 | 88 dB | 92% | 88 Hz | GHI789 | 93% | 47.6062° N, 122.3321° W | 98 s | 45 s | 41 | tions—and returns a confidence score which is attached to the one or more alleged citation package 507.

The one or more alleged citation package 507 is then submitted to the one or more backend services 502 as well as the police department 113 for review. From here, the police department 113 can review and accept or reject the citation 509. If it is rejected, it is saved for an appropriate duration until it is archived. If it is accepted as a legitimate citation as deemed by the police department 113, it is passed to the citation distributor 510. The citation distributor 510 works with the parties in their municipality to ensure the alleged offender 116 receives the citation, pays the citation as necessary, and that all information is provided to the DMV/state 115 department as necessary.

The one or more backend services 502 provides an interaction point for all various stakeholders—the police department 113, the court 114, the DMV/state departments 115, and the alleged offender 116. There are multiple methods to transmit the infraction data to the various stakeholders including the alleged, the court, the police force, the DMV, and the state departments. These include issuing a citation to the alleged, providing infraction information to the court, providing methods to investigate the infraction to the police force, and allowing the appropriate state departments to view infractions.

The manner in which a citation is issued varies between jurisdictions based on their laws. Some jurisdictions allow citations to be issued based on objective criteria, while other jurisdictions allow citations to be issued based on subjective criteria. Additionally, some jurisdictions require training the police force to issue proper citations, whereas others will not.

Infraction information will have to be transmitted by the one or more backend services 502 to the Police Department, the Court, and the proper municipal agencies. Agencies such as the DMV or equivalent state department will receive this infraction information on a system they maintain, and retain this infraction information for their own records. The DMV or equivalent local department will decide whether or not the person has paid their fines according to the citation issued, and whether to take further action.

A preponderance of evidence is a threshold by which a court can decide if a civil infraction has occurred and can be upheld. The police department 113 will provide a citation with associated case number and proper evidence to the court 114, as well as to the alleged offender 116. The accused can dispute the citation 512 in court, it is then up to the judge to review the evidence provided by the police officer to see if the citation should be upheld, reduced, or dismissed altogether.

The court 114 city attorney or judge has the right and ability to access data gathered by the one or more backend services 502. This data is the same the police officers used to evaluate the infraction. The court has the ability to review this information, as well as the police officer's interpretation of that information to see if the citation should be upheld, reduced, or rejected.

The appropriate state department 115, city, or court 114 administration also has the ability to review the one or more backend services 502 case management system as well as work with the citation distributor 510 to evaluate the status of a citation, and whether further action must be taken against the accused in the case of delinquent payment.

The alleged offender 116 is given the right and opportunity to review the data collected for their citation via the one or more backend services 502 or citation distributor 510.

Figure 6:
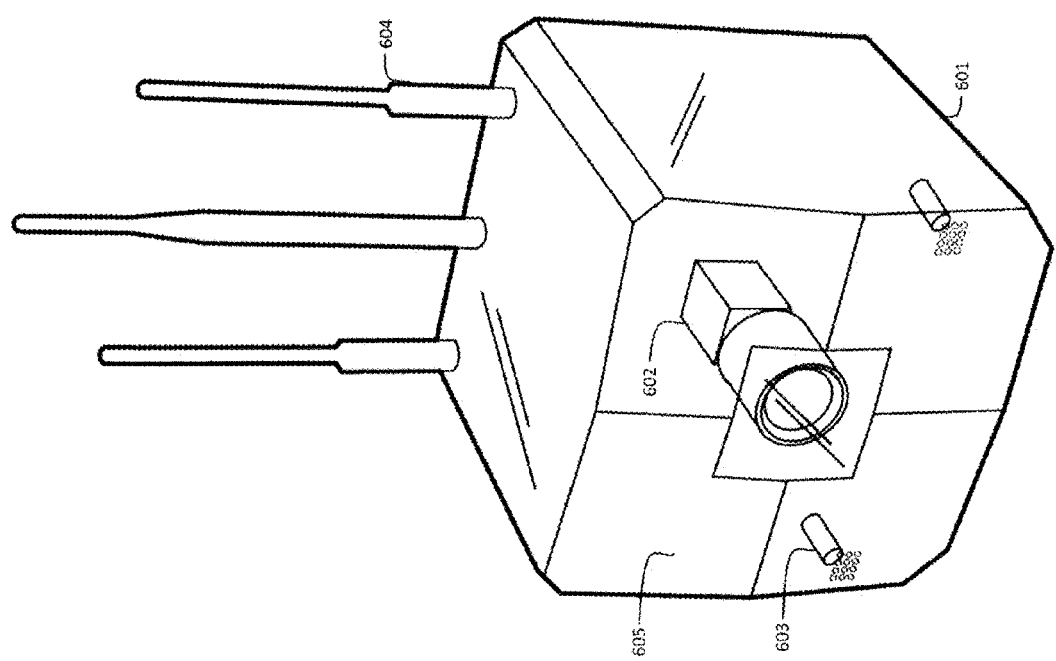
FIG. 6 is a perspective view of a noise violation identifier system, in accordance with an embodiment of the invention.

FIG. 6 describes one possible embodiment of the noise violation identifier system. This embodiment contains a device enclosure 601, a one or more visual sensors 602, one or more acoustic sensors 603, one or more sets of communications equipment 604, and internal electronics 605.

In some embodiments, the camera system functions as the first stage in the described method wherein the system includes equipment to detect and record a noise violation. In some embodiments, the system includes one or more cameras configured to view the area surrounding the system including the roads alongside and/or near the system. In some embodiments, the one or more visual sensors 602 may include infrared, radar, LADAR, or other detection means capable of providing sensory data around the system for identifying a vehicle or other noise source. In some embodiments, the one or more visual sensors 602 are configured to capture images of vehicle license plates as vehicles pass the system and/or are detected making a noise infraction and/or at a time interval following a noise infraction.

In some embodiments, the one or more acoustic sensors 603 are positioned on, about, or within the device enclosure 601 and are configured to detect sound, including noise violations. In some embodiments there are multiple acoustic sensors 603 configured to assist in locating the source of the noise infraction by calculating the difference in time between when each acoustic detector 603 detects the offending noise and using said difference and the known speed to sound to estimate the direction of the infraction, which can be confirmed through reviewing data from the one or more visual sensors 602.

In some embodiments the system includes one or more sets of communications equipment 604 configured to transmit information from the system to one or more databases or other data recipients using wifi, land-line communications, radio, satellite, or other communications methods. In some embodiments there are multiple forms of communications equipment 604, combining multiple methods of transmitting data to provide redundancy in case of device failure.

In some embodiments, the system includes internal electronics 605 configured to transmit or receive information from another source through the one or more sets of communications equipment 604. In some embodiments the internal electronics may include a hard drive or other data storage device, or may be configured to immediately reroute data to an external location. In some embodiments the internal electronics 605 includes a computer processor configured to make determinations of noise violations based on data collected by the one or more acoustic sensors 603, and combine that with data from the one or more visual sensors 602 to record violations.

Figure 7:
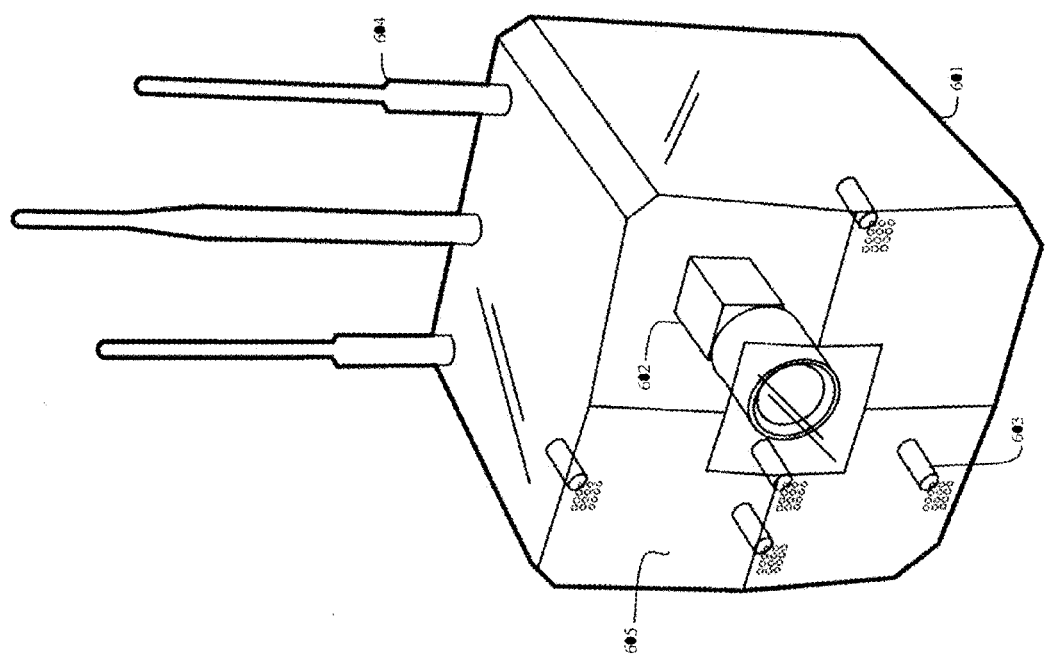
FIG. 7 is a perspective view of a noise violation identifier system, in accordance with an embodiment of the invention.

FIG. 7 describes one possible embodiment of the noise violation identifier system. This embodiment contains a device enclosure 601, one or more visual sensors 602, one or more acoustic sensors 603, one or more sets of communications equipment 604, and internal electronics 605.

In some embodiments, the camera system functions as the first stage in the described method wherein the system includes equipment to detect and record a noise violation. In some embodiments, the system includes one or more visual sensors 602 which are cameras configured to view the area surrounding the system including the roads alongside and/or near the system. In some embodiments, the one or more visual sensors 602 may include infrared, radar, LADAR, or other detection means capable of providing sensory data around the system for identifying a vehicle or other noise source. In some embodiments, the one or more visual sensors 602 are configured to capture images of vehicle license plates as vehicles pass the system and/or are detected making a noise infraction and/or at a time interval following a noise infraction.

In some embodiments, the one or more acoustic sensors 603 are positioned on, about, or within the device enclosure 601 and are configured to detect sound, including noise violations. In some embodiments there are multiple acoustic sensors 603 configured to assist in locating the source of the noise infraction by calculating the difference in time between when each acoustic detector 603 detects the offending noise and using said difference and the known speed to sound to estimate the direction of the infraction, which can be confirmed through reviewing data from the one or more visual sensors 602.

In some embodiments the system includes one or more sets of communications equipment 604 configured to transmit information from the system to one or more databases or other data recipients using wifi, land-line communications, radio, satellite, or other communications methods. In some embodiments there are multiple forms of communications equipment 604, combining multiple methods of transmitting data to provide redundancy in case of device failure.

In some embodiments, the system includes internal electronics 605 configured to transmit or receive information from another source through the one or more sets of communications equipment 604. In some embodiments the internal electronics may include a hard drive or other data storage device, or may be configured to immediately reroute data to an external location. In some embodiments the internal electronics 605 includes a computer processor configured to make determinations of noise violations based on data collected by the one or more acoustic sensors 603, and combine that with data from the one or more visual sensors 602 to record violations.

Figure 8:
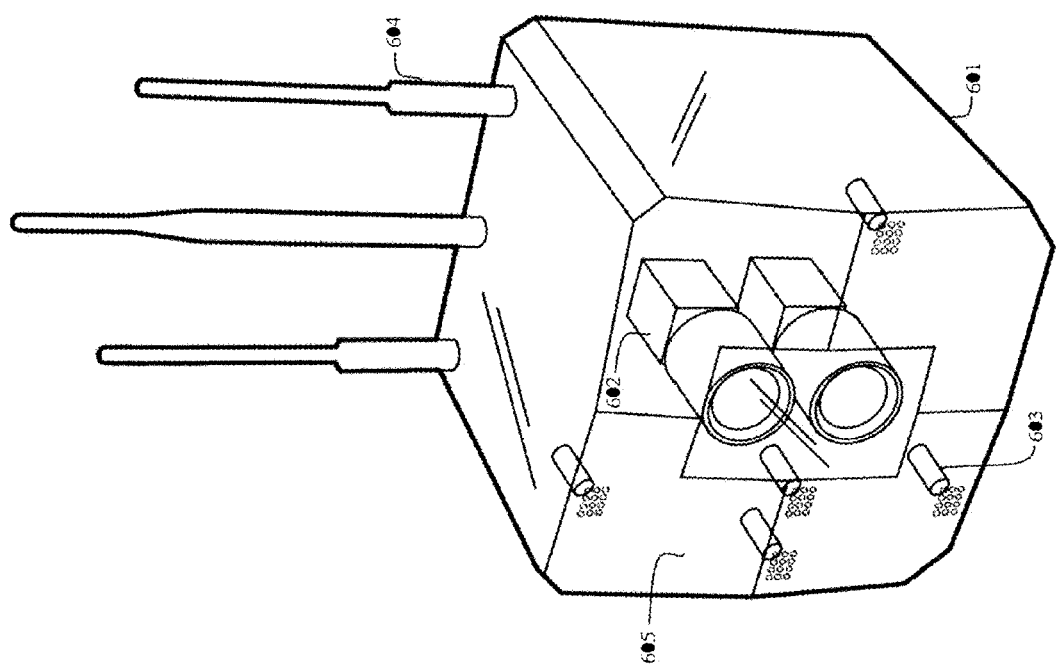
FIG. 8 is a perspective view of a noise violation identifier system, in accordance with an embodiment of the invention.

FIG. 8 describes one possible embodiment of the noise violation identifier system. This embodiment contains a device enclosure 601, one or more visual sensors 602, one or more acoustic sensors 603, one or more sets of communication equipment 604, and one or more internal electronics 605.

In some embodiments, the camera system functions as the first stage in the described method wherein the system includes equipment to detect and record a noise violation. In some embodiments, the system includes one or more visual sensors 602 which are cameras configured to view the area surrounding the system including the roads alongside and/or near the system. In some embodiments, the one or more visual sensors 602 may include infrared, radar, LADAR, or other detection means capable of providing sensory data around the system for identifying a vehicle or other noise source. In some embodiments, the one or more visual sensors 602 are configured to capture images of vehicle license plates as vehicles pass the system and/or are detected making a noise infraction and/or at a time interval following a noise infraction.

In some embodiments, the one or more acoustic sensors 603 are positioned on, about, or within the device enclosure 601 and are configured to detect sound, including noise violations. In some embodiments there are multiple acoustic sensors 603 configured to assist in locating the source of the noise infraction by calculating the difference in time between when each acoustic detector 603 detects the offending noise and using said difference and the known speed to sound to estimate the direction of the infraction, which can be confirmed through reviewing data from the one or more visual sensors 602.

In some embodiments the system includes one or more sets of communications equipment 604 configured to transmit information from the system to one or more databases or other data recipients using wifi, land-line communications, radio, satellite, or other communications methods. In some embodiments there are multiple forms of communications equipment 604, combining multiple methods of transmitting data to provide redundancy in case of device failure.

In some embodiments, the system includes internal electronics 605 configured to transmit or receive information from another source through the one or more sets of communications equipment 604. In some embodiments the internal electronics may include a hard drive or other data storage device, or may be configured to immediately reroute data to an external location. In some embodiments the internal electronics 605 includes a computer processor configured to make determinations of noise violations based on data collected by the one or more acoustic sensors 603, and combine that with data from the one or more visual sensors 602 to record violations.

Figure 9:
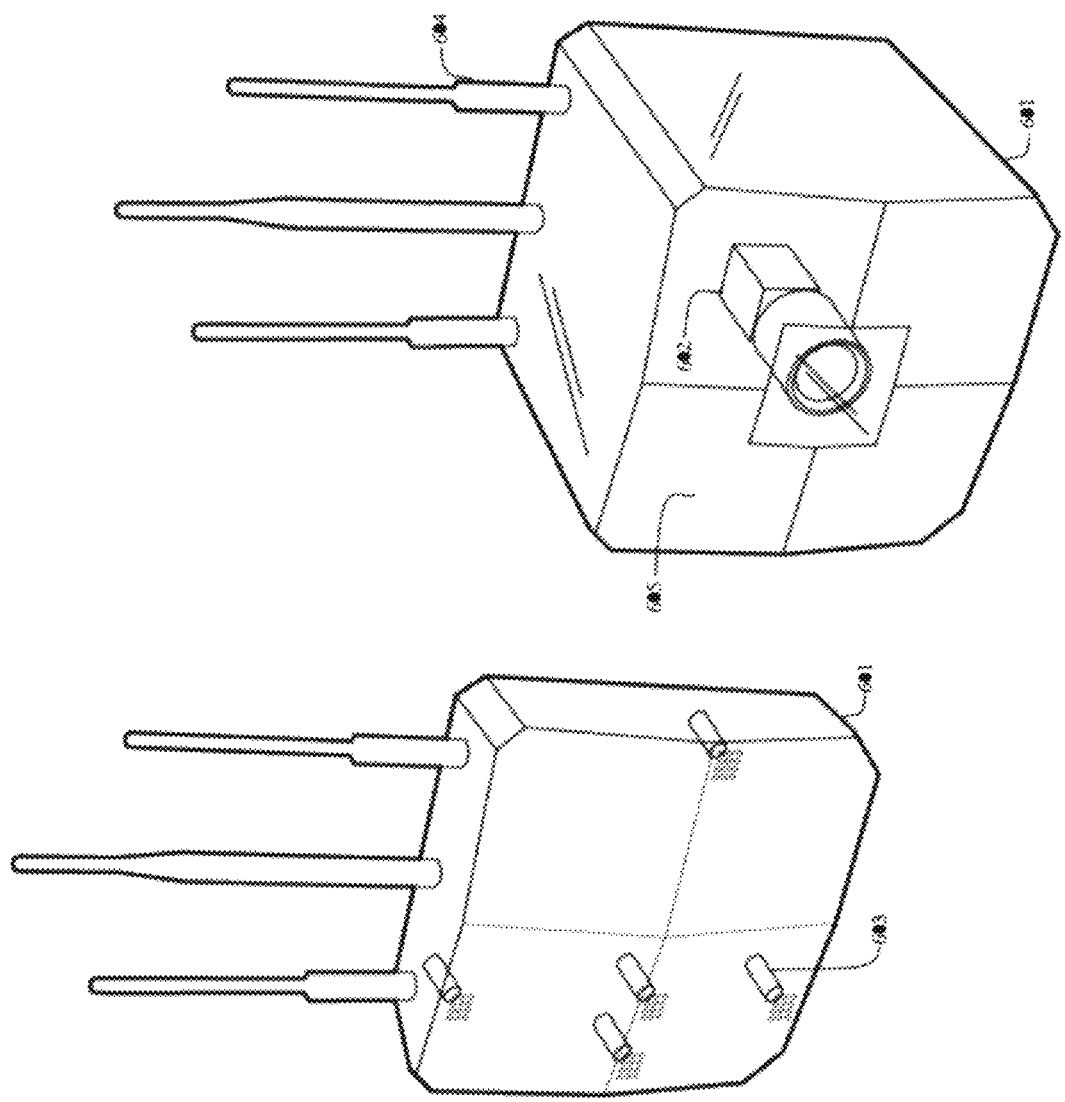
FIG. 9 is a perspective view of a noise violation identifier system, in accordance with an embodiment of the invention.

FIG. 9 describes one possible embodiment of the noise violation identifier system. In some embodiments the system comprises one or more device enclosures 601, one or more acoustic sensors 603 and one for the video equipment and electronics. One enclosure 601 contains one or more visual sensors 602, one or more sets of communications equipment 604, and one or more internal electronics 605.

In some embodiments there are multiple device enclosures 601 so that the system can have components positioned for optimal use based on a variety of factors including but not limited to ensuring adequate road coverage, making noise detections around corners or in areas with poor acoustics, or to otherwise ensure accuracy of the system. In some embodiments there are multiple device enclosures wherein the various components are distributed which may be positioned in a variety of configurations such as, but not limited to, having acoustic sensors 603 positioned in one or more of the device enclosures 601, or in addition enclosures as necessary to triangulate or otherwise locate the source of a noise violation. In some embodiments there are multiple device enclosures wherein the one or more visual sensors 602 are positioned. The one or more visual sensors 602 may be positioned in multiple locations to allow detection of a vehicle in situations including, but not limited to, acoustically poor locations or in areas with poor visibility, or to enable photographing or otherwise recording a vehicle and obtaining an image of both its front and rear license plates as necessary.

Figure 10:
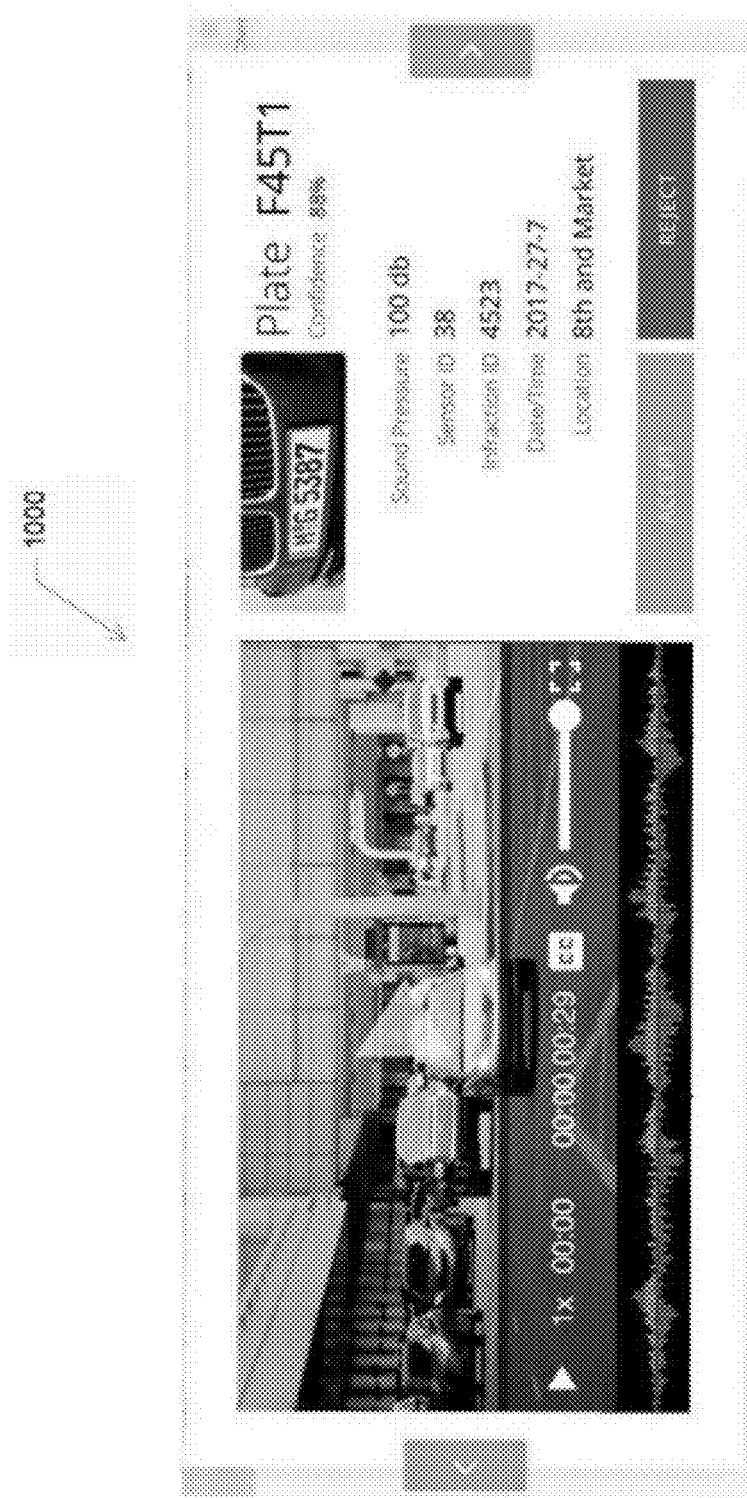
FIG. 10 is a screenshot of a user interface, in accordance with an embodiment of the invention.

FIG. 10 is a screenshot of a user interface 1000, as an example of what a user interface might appear like on the law enforcement or other enforcement end of a noise detection system. In some embodiments, the user interface is configured to allow a law enforcement officer or individual to review information associated with the alleged noise violation, including, but not limited to, the recorded time of the noise violation, the visual recording of the noise violation, the license plate of the offending vehicle, a computer estimation of the license plate of the offending vehicle, the decibel count of the offending noise, the sensor or system unit that detected the noise infraction, a unique identification number of the noise infraction, the date and time of the noise infraction, the location of the noise infraction, and/or the ability to accept or reject the infraction thereby either issuing or cancelling a citation.

Figure 11:
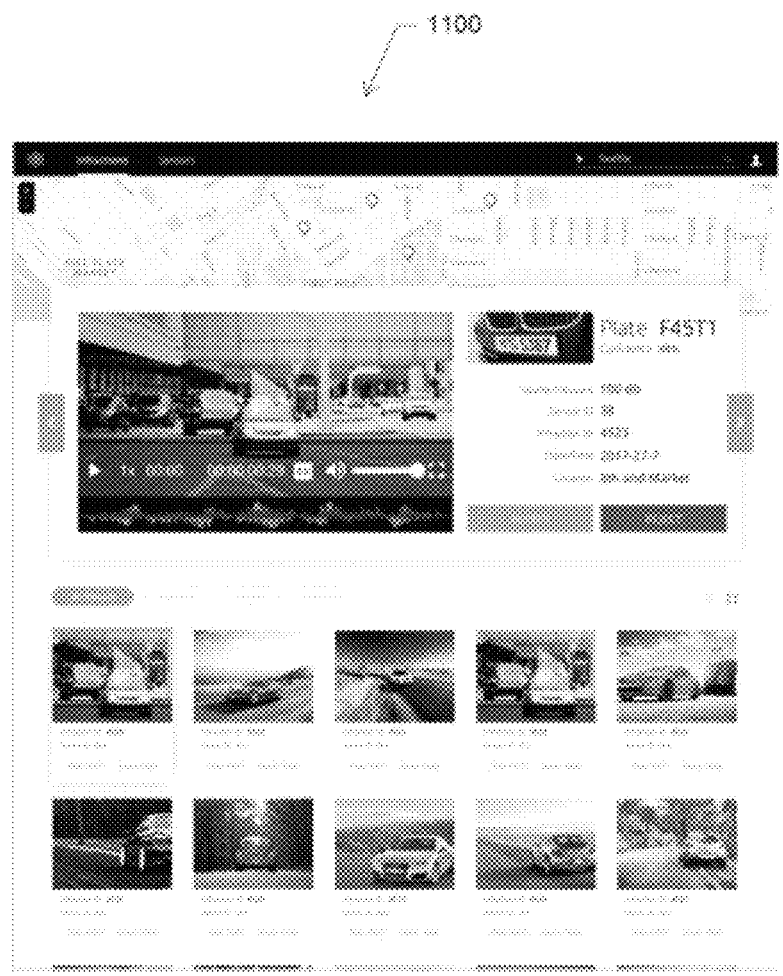
FIG. 11 is a screenshot of a user interface, in accordance with an embodiment of the invention.

FIG. 11 is a screenshot of a user interface 1000, as an example of what a user interface might appear like on the law enforcement or other enforcement end of a noise detection system. In some embodiments, the user interface is configured to allow a law enforcement officer or individual to review information associated with the alleged noise violation, including, but not limited to, the recorded time of the noise violation, the visual recording of the noise violation, the license plate of the offending vehicle, a computer estimation of the license plate of the offending vehicle, the decibel count of the offending noise, the sensor or system unit that detected the noise infraction, a unique identification number of the noise infraction, the date and time of the noise infraction, the location of the noise infraction, selectable items to accept, reject or otherwise interface with the infraction thereby either issuing or cancelling a citation, a list of other infractions that can be sorted and viewed in a variety of ways including time of infraction, make and/or model of the vehicle, unique identification number of the noise infraction, decibel level detected, the noise infraction detecting sensor, or by location of the noise infraction, in addition to showing a map of sensor locations superimposed on an existing map browser with information regarding the number of infractions detected by a given sensor in a given location.

In some embodiments, the camera system functions as the first stage in the described method wherein the system includes equipment to detect and record a noise violation. In some embodiments, the system includes one or more visual sensors 602 which are cameras configured to view the area surrounding the system including the roads alongside and/or near the system. In some embodiments, the one or more visual sensors 602 may include infrared, radar, LADAR, or other detection means capable of providing sensory data around the system for identifying a vehicle or other noise source. In some embodiments, the one or more visual sensors 602 are configured to capture images of vehicle license plates as vehicles pass the system and/or are detected making a noise infraction and/or at a time interval following a noise infraction.

In some embodiments, the one or more acoustic sensors 603 are positioned on, about, or within the device enclosure 601 and are configured to detect sound, including noise violations. In some embodiments there are multiple acoustic sensors 603 configured to assist in locating the source of the noise infraction by calculating the difference in time between when each acoustic detector 603 detects the offending noise and using said difference and the known speed to sound to estimate the direction of the infraction, which can be confirmed through reviewing data from the one or more visual sensors 602.

In some embodiments the system includes one or more sets of communications equipment 604 configured to transmit information from the system to one or more databases or other data recipients using wifi, land-line communications, radio, satellite, or other communications methods. In some embodiments there are multiple forms of communications equipment 604, combining multiple methods of transmitting data to provide redundancy in case of device failure.

In some embodiments, the system includes internal electronics 605 configured to transmit or receive information from another source through the one or more sets of communications equipment 604. In some embodiments the internal electronics may include a hard drive or other data storage device, or may be configured to immediately reroute data to an external location. In some embodiments the internal electronics 605 includes a computer processor configured to make determinations of noise violations based on data collected by the one or more acoustic sensors 603, and combine that with data from the one or more visual sensors 602 to record violations.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects. It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices, systems, and/or processes via the use of diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Accordingly, the scope of the invention is not limited by the disclosure of these preferred and alternate embodiments. Instead, the invention should be determined by reference to the claims that follow.

What is claimed is:

1. A method of detecting and penalizing noise violations implemented using at least one computer processor, the method comprising:
    passively measuring one or more levels of noise using an acoustic sensor and triggering further action upon detection of a noise above one or more defined levels;
    determining a location where the noise above one or more defined levels was produced;
    triggering one or more cameras to obtain at least one image of the location where the noise was produced, wherein the camera is passively recording the location; and
    processing the image of the location where the noise was produced to determine the license plate of an offending vehicle.

2. The method of claim 1, wherein the method further comprises:
    determining a time when the one or more levels of noise was measured.

3. The method of claim 2, wherein the method further comprises:
    processing data related to the measured level of noise and data related to an image of the location where the noise was produced to identify the source of the noise.

4. The method of claim 3, wherein the method further comprises:
    using location data and image data to identify a vehicle as the source of the noise.

5. The method of claim 4, wherein the method further comprises:
    obtaining license plate associated information for a vehicle identified as the source of the noise.

6. The method of claim 5, wherein the method further comprises:
    analyzing a measured noise level to determine if the measured noise level exceeds a legally defined threshold value.

7. The method of claim 6, wherein the method further comprises:
    sending an alert to a law enforcement related entity if a measured noise level exceeds a legally defined threshold value.

8. The method of claim 7, wherein the method further comprises:
    sending an alert to a law enforcement related entity that includes image data associated with a vehicle that produces a measured noise level that exceeds a legally defined threshold value.

9. The method of claim 6, wherein the method further comprises:
    sending an alert to a law enforcement related entity that includes image data associated with a vehicle that produces a measured noise level that exceeds a legally defined threshold value and data associated with a measured noise level produced by a vehicle that exceeds a legally defined threshold value.

10. The method of claim 6, wherein the method further comprises:
    sending an alert to a law enforcement related entity that includes license plate associated information associated with a vehicle that produced a measured noise level that exceeds a legally defined threshold value and at least one value for a measured noise level produced by the vehicle that exceeds a legally defined threshold value.

11. The method of claim 6, wherein the method further comprises:
    sending an alert to a law enforcement related entity that includes license plate associated information associated with a vehicle that produced a measured noise level that exceeds a legally defined threshold value, at least one value for a measured noise level produced by the vehicle that exceeds a legally defined threshold value, and a time when the vehicle produced a measured noise level that exceeded a legally defined threshold value.

12. A system for detecting and penalizing noise violations, the system comprising:
    one or more acoustic sensors configured to passively listen for noise and to send a triggering signal when a sound above a certain decibel amount is detected;
    one or more visual sensors configured to passively record a location and to preserve an image when instructed;
    one or more communications devices; and
    a computer processor the computer processor configured to:
        measure one or more levels of noise,
        compare the measured one or more levels of noise to one or more predefined maximum noise levels,
        instruct the one or more visual sensors to obtain an image of the location when a triggering signal is received from the one or more acoustic sensors,
        determine a location where the noise was produced, and
        processing the image of the location when the triggering signal was received to determine the license plate of an offending vehicle.

13. The system of claim 12, further comprising:
    one or more internal clocks.

14. The system of claim 13, wherein the computer processor is further configured to:
    determine a time when a level of noise was measured based on data from the one or more internal clocks.

15. The system of claim 13, wherein the computer processor is further configured to:
    process data related to the measured level of noise and data related to an image of the location where the noise was produced to identify the source of the noise.

16. The system of claim 12, wherein the computer processor is further configured to:
    process location data and image data to identify a vehicle as the source of the noise.

17. The system of claim 12, wherein the computer processor is further configured to:
    obtain license plate associated information for a vehicle identified as the source of the noise from the one or more visual sensors.

18. The system of claim 12, wherein the computer processor is further configured to:
    analyze a measured noise level to determine if the measured noise level exceeds a threshold value.

19. The system of claim 13, wherein the computer processor is further configured to:
    send an alert to a law enforcement related entity that includes license plate associated information associated with a vehicle that produced a measured noise level that exceeds a legally defined threshold value and at least one value for a measured noise level produced by the vehicle that exceeds a legally defined threshold value.

20. The system of claim 1, wherein the method further comprises:
    triggering the one or more cameras to record and store footage of a set period of time before and after the noise above one or more levels was produced.

* * * * *